2,767,079

PROCESS FOR DESILICONIZING AND DESULPHURIZING PIG IRON

René Perrin, Paris, France, assignor to Société d'Electro-Chimie d'Electro-Metallurgie et des Acieries Electriques d'Ugine, Paris, France, a corporation of France No Drawing. Application July 7, 1954,
Serial No. 441,924

Claims priority, application France January 14, 1954

4 Claims. (Cl. 75—54)

This invention relates to a process for desiliconizing and desulphurizing pig iron. The present application is an improvement on or modification of my copending applications Nos. 371,706, filed July 31, 1953, and 404,375, filed January 15, 1954.

In application 371,706, a process is described which enables one to accomplish the desiliconizing and desulphurizing of pig iron in a single operation by treating the pig iron with a slag of proper composition and amount and composed of desulphurizing elements such as lime, magnesia, barium oxide or soda and of metal oxides, mainly iron and/or manganese oxides and, if desired, fluidifying elements such as fluorspar. In the course of the treatment, the silicon of the pig iron first reduces most of the metal oxides, and the slag, thus modified in composition, becomes desulphurizing toward pig iron so that by extending the operation one obtains a substantial desulphurization.

The constituent elements of the desulphurizing slag can be charged together or separately, in the molten state or in the solid state. If these elements are charged in the molten state, there is the advantage that the final temperature of the pig iron is higher than would be the case if they were charged in the solid state. This permits employing slags richer in lime and, therefore, less fusible, but with a higher desulphurizing power. This method has on the other hand the disadvantage of requiring the use of a slag melting furnace for melting the slag forming elements prior to mixing them with the molten pig iron.

According to my application 404,375, a part or all of the iron or manganese oxides is formed by blowing air or other oxygen-containing gas into the molten pig iron to form iron or manganese oxides. This is followed by a second stage of intermixing in which the silicon of the pig iron reduces the oxides of iron and manganese. Because of the heat liberated by the burning of the oxidizable elements of the pig iron, this process may be carried out without previously melting the constituent elements of the slag.

In the process of my application 404,375, because of the heat liberated by the burning of the oxidizable elements of the pig iron, such process may be carried out without previously melting the constituent elements of the slag but it has the disadvantage of requiring the blowing of air or other oxygen-containing gas into the molten pig iron.

The process of the present application consists of introducing into the constituent elements of the slag, substances capable of reacting either among themselves, or with other elements present in the pig iron, so as to cause a particularly strong liberation of heat, in order to raise appreciably the temperature of the reaction products and the other elements of the slag, and even, if desired, bringing them to the temperature of the pig iron. By properly selecting the reacting bodies and the other elements of the slag, one can insure that the composition of the slag produced after reaction is such that it is molten at the temperature of the pig iron and is basic enough to have a suitable desulphurizing power.

In order to constitute an initial slag according to the present invention, one can replace, in the composition of a slag as described in my application 371,706, totally or partially, the iron and/or manganese oxides by one or several strong oxidizing agents such as calcium nitrate, calcium peroxide, sodium nitrate or sodium percarbonate capable of furnishing the same amount of oxygen as the oxides of iron and manganese and consequently, burning the same amount of silicon but liberating by the reaction a greater amount of heat. The use of strong oxidizing agents containing calcium or sodium presents the advantage of introducing, into the final slag, lime or soda, the effects of which are favorable both as to fusibility and desulphurizing power of the slag.

If desired, the slag forming elements may include iron and/or manganese oxide in addition to the strong oxidizing agent or agents referred to in the preceding paragraph. Furthermore, a strong reducing agent such as silicon or aluminum may be included with the slag forming elements, the strong reducing agent not acting directly in the desiliconization of the pig iron but being capable by reaction with the strong oxidizing agent of liberating an amount of heat substantially greater than that which would result only from the reaction of the silicon of the pig iron with the iron or manganese oxides. This additional quantity of heat is useful in causing the melting of the other elements of the slag.

The present process is advantageous in that it eliminates the necessity of using a separate slag melting furnace or an apparatus for blowing air or other oxygen-containing gas into the pig iron. It may be carried out advantageously by introducing molten pig iron to be desiliconized and desulphurized into a rotating mixer and then adding to the mixer a charge of the properly calculated slag forming elements. These slag forming elements may be added separately or mixed or after having been pulverized, mixed and compressed into the form of agglomerates such as briquettes.

If desired, the slag forming elements either separately or mixed or in the form of agglomerates can be placed in the bottom of a ladle and the pig iron can be poured into the ladle on top of the slag forming elements, in such case, however, the pouring should be regulated so as to avoid excessive spattering or overflowing of the pig iron or slag from the ladle.

Irrespective of the particular method of mixing the molten pig iron and the solid slag forming elements, the composition of the batch of slag forming elements is so calculated that, after the reaction with the molten pig iron and taking into consideration the silica produced by the oxidation of the silicon from the pig iron and the oxides resulting from the oxidation of other reducing agents, if any such are added, and taking into consideration the lime or soda or other bases produced by the decomposition of the oxidizing agent, a desulphurizing slag which is molten at the pig iron temperature is formed.

In practicing my invention, the amount of slag forming elements used in proportioned to oxidize the amount of silicon which it is desired to remove from the pig iron. The reaction between the molten pig iron and the slag is carried out until most, and preferably substantially all, of the oxidizing agent, whether the oxidizing agent be a strong oxidizing agent as herein defined or iron and/or manganese oxide, or a mixture of any of these oxidizing agents, is decomposed and the slag is converted to a reducing slag. The reaction between the molten pig iron and slag is thereafter continued for a time sufficient for the desulphurizing elements to lower the sulphur content of the pig iron. Preferably, the amount of slag forming elements used is so proportioned to the amount of pig iron being treated, and its silicon content, that the pig iron still contains remaining silicon at the end of the desiliconization to aid in the removal of sulphur during the subsequent action of the slag on the pig iron.

The following examples further illustrate my invention.

*Example 1*

25 metric tons of molten pig iron having the following composition and at a temperature of about 1390° C. were introduced into a basic lined rotating mixer:

| | Percent |
|---|---|
| C | 3.65 |
| Si | 0.82 |
| Mn | 0.44 |
| S | 0.06 |
| P | 1.84 |

It was desired to lower the silicon content of the pig iron about 0.3% and to cause at the same time the formation of a slag composed of about:

| | Percent |
|---|---|
| $SiO_2$ | 34 |
| CaO | 48 |
| $Al_2O_3$ | 14 |
| $CaF_2$ | 4 |

Such slag combines an acceptable fusibility and a good desulphurizing power.

Accordingly, about 500 kgs. of agglomerated briquettes, of 20-25 kgs. each, of a mixture composed as follows were added to the pig iron in the mixer:

| | Percent |
|---|---|
| Calcium nitrate | 52 |
| Lime | 26 |
| Alumina | 13 |
| Fluorspar | 4 |

After the addition of the briquettes, the mixer was rotated for three minutes and then the slag was decanted over a period of another three minutes.

The decanted slag was composed of:

| | Percent |
|---|---|
| $SiO_2$ | 32 |
| CaO | 45 |
| $Al_2O_3$ | 13 |
| $CaF_2$ | 3.9 |
| FeO | 1.1 |
| MnO | 1.0 |
| S | 1.6 |

The silicon content of the pig iron was lowered to 0.52%; the sulphur content to 0.03%; the other elements had not been substantially altered, except the manganese, the content of which was slightly lowered to 0.35%. The pig iron temperature was raised about 50° C.

*Example 2*

20 metric tons of molten pig iron having the following composition were introduced into a basic lined rotating mixer:

| | Percent |
|---|---|
| C | 3.86 |
| Si | 0.84 |
| Mn | 0.55 |
| S | 0.08 |
| P | 1.84 | and then about 500 kgs. of agglomerated briquettes having the following composition were added to the pig iron:

| | Percent |
|---|---|
| Sodium nitrate | 40 |
| Lime | 45 |
| Alumina | 12 |

After three minutes of intermixing and two minutes of decanting, the slag formed was composed of:

| | Percent |
|---|---|
| $SiO_2$ | 28 |
| CaO | 45 |
| $Al_2O_3$ | 12 |
| $Na_2O$ | 9 |
| FeO | 1.0 |
| MnO | 0.9 |
| S | 1.7 |

*Example 3*

25 metric tons of molten pig iron of the following composition were introduced into a basic lined rotating mixer:

| | Percent |
|---|---|
| C | 3.84 |
| Si | 0.81 |
| Mn | 0.56 |
| S | 0.07 |
| P | 1.85 | and then 970 kgs. of agglomerated briquettes composed of:

| | Percent |
|---|---|
| $Fe_2O_3$ | 28 |
| CaO | 32 |
| $Al_2O_3$ | 10 |
| $CaF_2$ | 3 |
| $Ca(NO_3)_2$ | 12 |
| Ferrosilicon at 50% | 10 | were added to the molten pig iron.

After three minutes of intermixing and two minutes of decanting, the slag formed was composed of:

| | Percent |
|---|---|
| $SiO_2$ | 34 |
| CaO | 45 |
| $Al_2O_3$ | 12 |
| $CaF_2$ | 3.8 |
| FeO | 1.2 |
| MnO | 1.0 |
| S | 1.5 |

The silicon content of the metal was lowered to 0.50%; its sulphur content to 0.025%; its manganese content to 0.53%. The other elements had not been substantially altered. The metal temperature was raised about 30° C.

The invention is not limited to the preferred embodiments but may be otherwise embodied or practiced within the scope of the following claims.

I claim:

1. A process for producing from a starting pig iron, a modified pig iron containing lower amounts of silicon and sulphur than the starting pig iron, which comprises mixing molten starting pig iron with solid slag forming elements which, when melted, form a basic slag containing a basic element of the group consisting of lime, magnesia, barium oxide and soda and also containing an oxidizing agent of the group consisting of calcium nitrate, calcium peroxide, sodium nitrate and sodium percarbonate, the amount and composition of said slag being such that the slag contains less of said oxidizing agent than is required to oxidize all of the silicon of the starting pig iron so that after reaction of substantially all of said oxidizing agent in said slag with silicon in the pig iron the pig iron contains a substantial amount of silicon and the slag is converted to a reducing slag, carrying out the reaction until substantially all of said oxidizing agent has been reduced to metal, the silicon content of the pig iron has been substantially lowered without substantially altering the carbon content of the pig iron and the slag is converted to a reducing slag, and continuing the action of the reducing slag on the pig iron containing a substantial amount of silicon for a time sufficient to substantially lower the sulphur content of the pig iron.

2. A process according to claim 1, wherein the basic slag formed upon melting of the slag forming elements contains about 52% calcium nitrate, about 26% lime and about 13% alumina.

3. A process according to claim 1, wherein the basic slag formed upon melting of the slag forming elements contains about 40% sodium nitrate, about 45% lime and about 12% alumina.

4. A process according to claim 1, wherein the basic slag formed upon melting of the slag forming elements contains about 25 to 45% lime and about 10 to 15% alumina.

References Cited in the file of this patent

UNITED STATES PATENTS

| 905,281 | Betts | Dec. 1, 1908 |
| 1,848,323 | Davies | Mar. 8, 1932 |

FOREIGN PATENTS

| 476,483 | Great Britain | Dec. 9, 1937 |